United States Patent [19]

Giddings

[11] 4,140,050
[45] Feb. 20, 1979

[54] METHOD AND APPARATUS FOR CONTROLLING RATE RELATED MANUFACTURING OPERATIONS USING A REACTION SIMULATION TECHNIQUE

[75] Inventor: Sydney A. Giddings, Cincinnati, Ohio

[73] Assignee: Formica Corporation, Cincinnati, Ohio

[21] Appl. No.: 846,054

[22] Filed: Oct. 27, 1977

[51] Int. Cl.² ............................................. B30B 15/34
[52] U.S. Cl. .................................... 100/38; 100/93 P; 156/359; 156/583; 425/143; 425/384

[58] Field of Search ................... 100/38, 93 P, 35, 50, 100/43; 156/359, 498, 583, 366; 425/143, 144, 384, 338, 334, 406, 446

[56] References Cited

U.S. PATENT DOCUMENTS

| | | | |
|---|---|---|---|
| 2,432,215 | 12/1947 | Stocker | 100/93 P X |
| 3,960,069 | 6/1976 | Bowyer | 100/38 |

Primary Examiner—Peter Feldman
Attorney, Agent, or Firm—Frank M. Van Riet

[57] ABSTRACT

A method and apparatus are disclosed whereby a laminating press is controlled using the relative cure of a resinous material as the primary factor.

4 Claims, 1 Drawing Figure

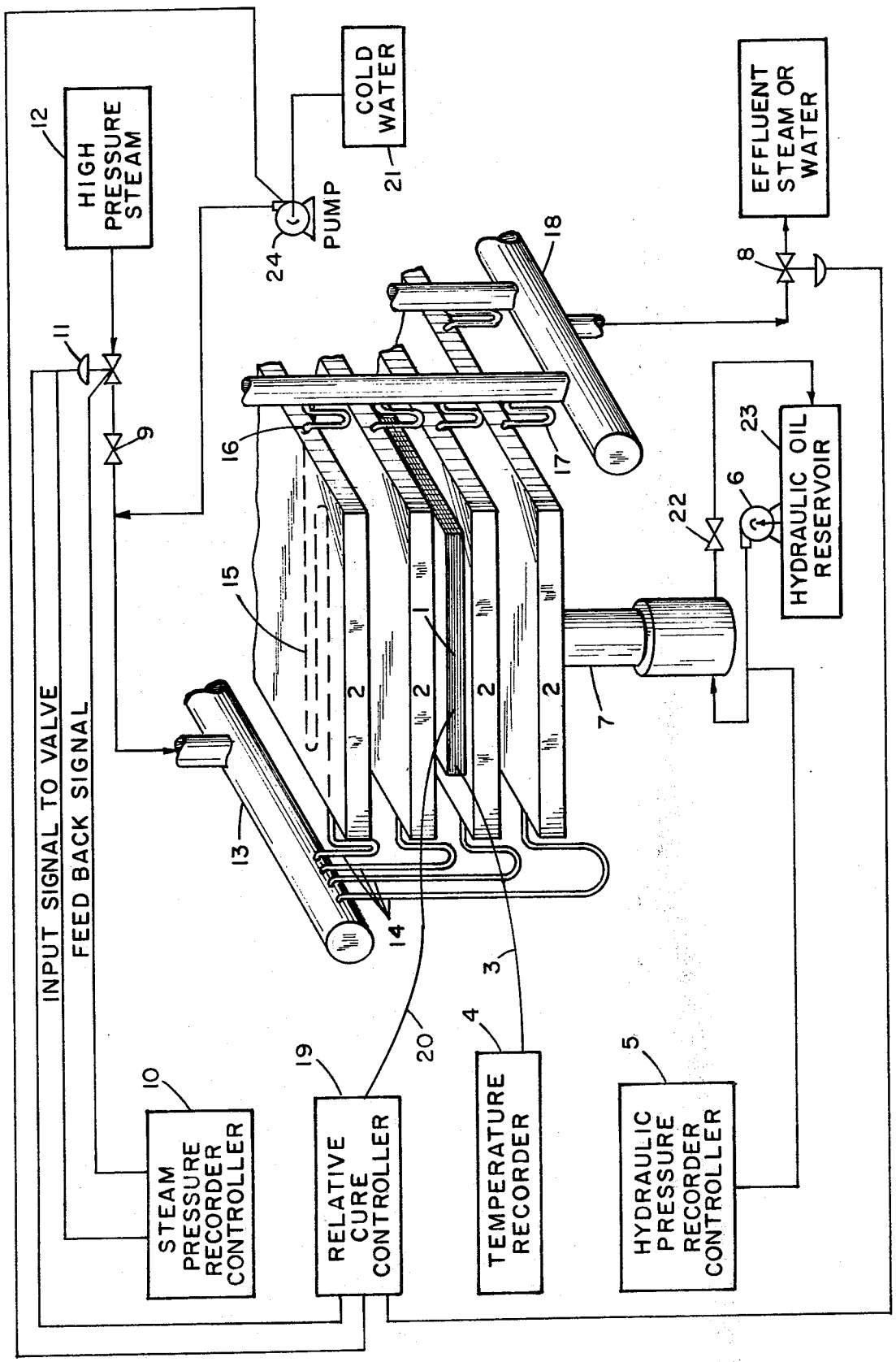

METHOD AND APPARATUS FOR CONTROLLING RATE RELATED MANUFACTURING OPERATIONS USING A REACTION SIMULATION TECHNIQUE

BACKGROUND OF THE INVENTION

U.S. Pat. No. 3,960,069 shows an automatically controlled press which represents a substantial improvement in the state of the art over the manually controlled units. The equipment used in the control scheme comprises, in combination, an electronic set point programmer, an electronic process controller with proportional, integral and derivative modes of control and an EMF to pneumatic converter. The programmer can be any commercially available electrostatic line-following programmer, having a minimum of two programmable function switches, e.g. relays. The desired program is drawn on a plastic card, with one axis for time, the other for the programmed parameter, i.e. temperature. The card is coated with a conductive surface and by scribing the desired time-temperature profile on the card, two electrically isolated conductive planes are created. By energizing each plane with opposite phase AC voltages, a voltage gradient is established across the gap on the chart. A non-contacting probe seeks the zero potential existing at the center of the program curve, mechanically positioning an output potentiometer contained therein. When the program start switch is energized, the program advances and the non-contacting probe follows the curve, precisely positioning the potentiometer whose output is used to command the controller. Thus, the set point programmer is used to program the heating time-temperature profile that is to be imposed on the material being cured in the press. The programmed time-temperature profile is used as the set point input to the process controller. Furthermore, the set point programmer controls the open or close function of the blow-off valve and the on or off function of the cooling water pump as functions of time by means of two programmable relays. The programmable relays are phototransistor sensors that conduct, allowing light from a light-emitting diode therein to energize the photo sensors, thus energizing the relays.

The process controller accepts the set point input from the programmer and a thermocouple temperature feedback signal from thermocouple sensor, located in the pack being cured. It compares the error between these two signals and generates a corrective control signal provided by the modes of control.

The combined effect is automatic operation of the steam valve, the blow-off valve and the cooling water pump in such a way as to achieve a programmed cure cycle.

The control scheme of U.S. Pat. No. 3,960,069 systematically appraises the current conditions versus the desirable conditions at that point in the procedure and signals various responses in equipment to correct or adjust to maintain the most advantageous conditions. Nevertheless, imbalances, particularly unexpected occurrences such as a short term overload demand on utilities, result in an inability to fulfill the signaled corrective action. This causes an uncorrected, albeit temporary, deviation from the desired and necessary conditions to obtain proper cure.

SUMMARY OF THE INVENTION

This invention relates to a method of controlling a reaction using a reaction simulator-accumulator control method which appraises the effectiveness of the ongoing reaction time-temperature relationships and continuously compares the simulated results to the desired preprogrammed or set goals resulting in interactive control responses. To effect the control, the system uses the time-temperature measurements from the actual reaction being conducted as inputs to a reaction simulation algorithm which calculates the extent of reaction being realized under prevailing conditions. Utilizing this information, positive control actions can be implemented to ensure the accomplishment of the desired level of completed reaction with greater certainty than achieved using the state of the art control techniques which depend on adjustment and maintenance of fixed or pre-scheduled path for the reaction conditions.

More specifically, this invention relates to the operation of a laminating press used in the preparation of batch cured laminates, wherein, the large laminating presses must be cycled thru repetitive time-temperature schedules designed to give the laminates proper cure to establish a desirable balance between various properties. Erratic inabilities still exist in the accomplishment of these pre-planned curing schedules regardless of the sophistication of the controller used, even such as that described in U.S. Pat. No. 3,960,069 as discussed above.

In this invention, in the case of a temperature below that desired, the relative cure controller, performing its designed function of summating the degree of goal accomplishment, will dictate a slightly longer residence time at temperature to compensate. This type of failure to comply with the pre-planned schedule may be caused by an overload demand on utilities, as mentioned above. In like manner, an erratic valve response could cause a temperature over-shoot which would result in the cure cycle being terminated slightly earlier using this invention than a pure time control schedule would have dictated. This type of response is a failsafe correction. Similar type corrections, although of a less dramatic nature, are performed in the manner of simple adjustments for the tendency to ride on the high or low side of the temperature range as controlled by the standard prior art system. In this manner, the operation of the instant invention is in the normal manner of control, in that it is compensating for expected variation which are inherent to all systems, thus ensuring a more consistent result than attainable without its use.

DESCRIPTION OF THE DRAWING

The drawing is a diagrammatic view of the press control process and apparatus of the instant invention as applied to a steam-heated, water-cooled press.

DESCRIPTION OF THE INVENTION

According to the instant invention, a laminate assembly is pressed to form a decorative laminate by placing the assembly between the heatable platens of a press which is then closed. The assembly is subjected to elevated heat and pressure to effect consolidation.

The temperature of the assembly (press) is measured by a suitable device, such as a thermocouple, and transmitted to the relative cure controller. The time is also made available to the controller such as by an external device e.g. a clock, or an internal "clock", provided in most currently available minicomputers. The controller combines these two signals to calculate the ongoing summation of the relative cure as a measure of the accomplishment of the final goal i.e. the desired relative cure.

An example of effecting this combination is set forth hereinbelow. As the relative cure is continuously or periodically calculated, it is checked against the desired relative cure and control action is taken accordingly. In the preferred embodiment, the process is allowed to continue (maintain heat) until the desired goal is reached, at which time the heat is removed from the process. This removal is accomplished by turning off the steam and opening the by-pass valve, followed by administering cold water.

It is appreciated that control action can be taken throughout the processing period to adjust the amount of goal accomplishment to attain the final goal in a desired time frame. This can be accomplished by minor adjustments to the steam valve or other means to control the amount of heat input to the process.

More specifically, the instant invention comprises a method of controlling the pressing of a laminate assembly to form a laminate wherein the assembly is placed between the heatable platens of a press which is then closed and the assembly is subjected to elevated temperature and pressure comprising 1. measuring the temperature of said laminate,
2. providing a first signal representative of said measured temperature to a relative cure controller,
3. measuring the time said laminate has been subjected to said elevated temperature and pressure in said press,
4. providing a second signal representative of said measured time to said relative cure controller,
5. providing a signal representative of the desired final relative cure for said laminate to said relative cure controller,
6. calculating the relative cure of said laminate in said press from said time and temperature signals,
7. comparing the calculated relative cure to said desired final relative cure,
8. providing a third signal representative of said comparison and
9. controlling the removal of heating media from and the introduction of cooling media to said press in response to said third signal.

This invention also comprises apparatus for controlling a laminate assembly press having heatable platens which, when closed, subject said assembly to elevated temperature and pressure to form a laminate comprising 1. means for measuring the temperature of said laminate and providing a first signal representative of the measured temperature to a controller means,
2. means for measuring the time said laminate has been subjected to said elevated temperature and pressure in said press and providing a second signal representative of the measured time to a controller means,
3. controller means for (A) calculating the relative cure of said laminate in said press in response to said first and second signals, (B) comparing the calculated relative cure to a desired final relative cure for said laminate and (C) outputting a third signal representative of said comparison, and
4. control means for controlling the removal of heating media from and the introduction of cooling media to said press in response to said third signal.

The control technique utilizes a logic circuit which is programmed using a reaction kinetics formula, such as the following based on first order reactions:

$$RC = \frac{\sum_{i=1}^{n} e^{\frac{-Ea}{RT_i}} \times t_i}{e^{\frac{-Ea}{RT_c}} \times t_c}$$

wherein $T_i$ and $t_i$ are incremented values of absolute temperature and time as sensed from the on-going reaction being controlled. The $e$ is the transcendental number used as the base for the Napierian logarithms. Ea, the energy of activation, is a rate determining factor established for the system being controlled. R is the universal gas constant. $T_c$ and $t_c$ are temperature and time constants established to normalize the RC (relative cure) value at unity for a pre-determined point described as ideal complete reaction. The exact value for RC for the desired property balanced control point must be previously established based on performance correlations.

The form of the logic equation, as stated above, is for first order kinetics. Other equation forms recognized in the literature can be used where they, for one reason or the other, better describe the reaction kinetics.

With reference to the drawing in which the superstructure of the press has been omitted for purposes of clarity, the press pack 1 is inserted between the platens 2 of the press. Only one press pack is shown; however, in commercial operation, press packs would be placed between each pair of press platens. A thermocouple sensing wire 3 is inserted into the pack and connected to a temperature recorder 4.

The press cycle begins with the hydraulic pressure recorder controller 5 set to the required pressure. Valve 22 is closed and pump 6 is activated to thereby pump oil from reservoir 23 to ram 7 to force the ram upward and close the press.

At the same time, effluent or by-pass valve 8 is opened and steam supply valve 9 is opened. Steam pressure recorder controller 10 is set between about 20–100 lbs. gage pressure activating pneumatic control valve 11 and permitting steam 12 to flow through manifold 13 which distributes the steam through the flexible piping 14 to channels 15 in the press platens 2. The steam exits the platens at 16, passes through flexible piping 17 to second manifold 18 and is discharged through valve 8.

This preliminary preheatup completely removes all water from the platens from the previous pressing within a few minutes. By-pass valve 8 is then closed.

The temperature of the pack, as indicated by recorder 4, will gradually rise to between about 130°–150° C. within about 15–30 minutes. The steam pressure in the press is adjusted in order to execute the desired time-temperature profile. The specified cure cycle usually consists of a heat-up period and cure period of about 10–30 minutes.

The relative cure controller 19 uses a thermocouple sensing wire 20 to monitor the temperature response of the curing material. When the summated function being calculated by the controller logic in response to the temperatures being sensed reaches the predetermined target value indicating the end of the cure period, the press cooling sequence is initiated. First, the pneumatic control valve 11 is closed and effluent valve 8 is opened. When the allowed time for pressure to dissipate has elapsed (approximately 2 minutes) the cooling water pump 24 is started thereby forcing cold water 21 to flow through the manifold 13, etc.

It usually takes about 10–30 minutes to reduce the temperature of the pack to about 30° C.–40° C. after which the water pump is shut off and the water supply is ceased. Then the hydraulic pump 6 is shut off and valve 22 is opened relieving the hydraulic pressure and opening the press.

The advantages of the system over the prior art is that the end of cure can be more consistently determined via appraising the effectiveness of cure accomplishment based on actual temperatures occuring, than methods based solely on the passage of time.

To establish the control equation for a laminate would require the use of Torsional Braid Analysis (TBA) of the laminating resin. Having established first order kinetics to prevail, the results of the TBA are determined at four isothermal levels bracketing the operational temperature range of interest. Using the logarithmic transforms on the relative rigidity results of the time related TBA output, a curve fit equation is determined yielding a reaction rate, k, for that temperature.

Having the results at the four different temperature (T) levels, and again using a logarithmic transform on the k values, the Ea value is determined from the slope of the line relating ln k to 1/RT.

$T_c$ is taken as a temperature most representative of the press cure temperature. The time constant, $t_c$, is the inverse of the reaction rate, k, at the temperature, $T_c$, and is related to the time the resin would take to reach a relative rigidity of one.

With the necessary factors determined for the system in a preferred embodiment of the instant invention, a programmable minicomputer, interconnected with a temperature sensing interface, can be used to monitor the pressing operations for the preparation of laminates at several RC cure levels. Physical property testing is conducted and the results of the properties of interest are correlated to RC values to determine the desired final relative cure.

The term "desired final relative cure" is meant to include that amount of cure which continues to be incurred after the cooling of the press has been initiated but before complete cooling is effected. The relative cure at which the cooling cycle is initiated is determined by subtracting said amount of curing incurred during cooling from the desired final relative cure. This amount of additional curing is known from previous experience.

Full interactive control can then be established by electrically connecting the computer to a sequencing switch which is wired to conduct the necessary steps for cooling and terminating the press cycle. Utilizing the relative cure at which the cooling cycle is initiated, all subsequent pressings are automatically terminated at the desired final relative cure with minimal variation in the cure level.

Further reduction in the amount of cure variation can be achieved by simulating the press cooling that can be anticipated with each cycle to predict the amount of curing incurred after cooling is initiated.

Use of the relative cure control system of this invention does not require elaborate temperature level control devices and is also very effective in a manually controlled system. In such a system, the operator proceeds to initiate all operational procedures while the RC controller monitors the performance and summates its effectiveness. The unit can front panel indicate the progress of the operation and simply signal the operator to terminate the procedure. As discussed above, these same adjustments can be effected using automatic controls initiated and varied by the RC controller.

I claim:

1. A method of controlling the pressing of a laminate assembly to form a laminate wherein the assembly is placed between heatable platens of a press which is then closed subjecting the assembly to elevated temperature and pressure comprising
    1. measuring the temperature of said laminate,
    2. providing a first signal representative of said measured temperature to a relative cure controller,
    3. measuring the time said laminate has been subjected to said elevated temperature and pressure in said press,
    4. providing a second signal representative of said measured time to said relative cure controller,
    5. providing a signal representative of the desired final relative cure for said laminate to said relative cure controller,
    6. calculating the relative cure of said laminate in said press from said time and temperature signals,
    7. comparing the calculated relative cure to said desired final relative cure,
    8. providing a third signal representative of said comparison and
    9. controlling the removal of heating media from and the introduction of cooling media to said press in response to said third signal.

2. A method according to claim 1 wherein said third signal is provided to each of a pair of relays so as to energize means for removing heating media from and means for introducing cooling media to said press.

3. Apparatus for controlling a laminate assembly press having heatable platens which, when closed, subject said assembly to elevated temperature and pressure to form a laminate comprising
    1. means for measuring the temperature of said laminate and providing a first signal representative of the measured temperature to a controller means,
    2. means for measuring the time said laminate has been subjected to said elevated temperature and pressure in said press and providing a second signal representative of the measured time to a controller means,
    3. controller means for (A) calculating the relative cure of said laminate in said press in response to said first and second signals, (B) comparing the calculated relative cure to a desired final relative cure for said laminate and (C) outputting a third signal representative of said comparison, and
    4. control means for controlling the removal of heating media from and the introduction of cooling media to said press in response to said third signal.

4. An apparatus according to claim 3 wherein said control means comprises
    a first relay means for energizing means for removing heating media from said press in response to said third signal from said controller means and
    a second relay means for energizing means for introducing cooling media to said platens in response to said third signal from said controller means.

* * * * *